May 30, 1933.  B. J. HASKINS  1,912,135
SWITCH FOR BATTERY CHARGERS
Filed Aug. 25, 1930  2 Sheets-Sheet 1

Inventor:
Butler J. Haskins,

May 30, 1933. B. J. HASKINS 1,912,135
SWITCH FOR BATTERY CHARGERS
Filed Aug. 25, 1930 2 Sheets-Sheet 2
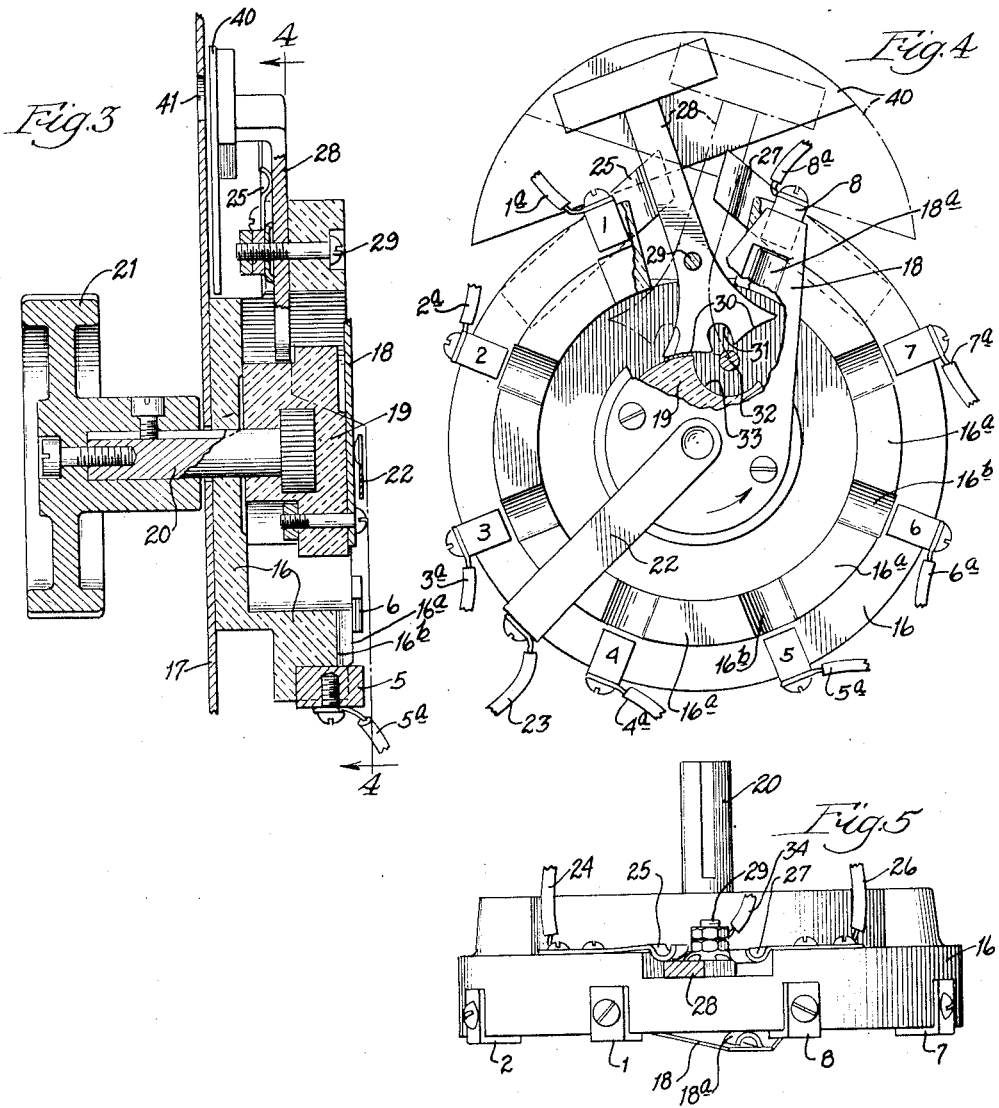

Patented May 30, 1933

1,912,135

UNITED STATES PATENT OFFICE

BUTLER J. HASKINS, OF CHICAGO, ILLINOIS, ASSIGNOR TO JOSEPH WEIDENHOFF, INC., OF CHICAGO, ILLINOIS, A CORPORATION OF ILLINOIS

SWITCH FOR BATTERY CHARGERS

Application filed August 25, 1930. Serial No. 477,526.

This invention relates to switches, and particularly to switches for use in battery charging apparatus.

An object of the invention is to provide a simplified form of switch in which a few contacts do duty for many.

Another object is to provide means for increasing the voltage on a charger one small step at a time, and for automatically preventing any increase at a higher rate.

These and other objects, as will hereinafter appear, are accomplished by this invention which is fully described in the following specification and shown in the accompanying drawings, in which—

Fig. 3 is a partial enlarged section on the line 3 of Fig. 2;

Fig. 4 is a rear elevation of the switch of Fig. 3; and

Fig. 5 is a side elevation showing details of the switch.

Figure 1:
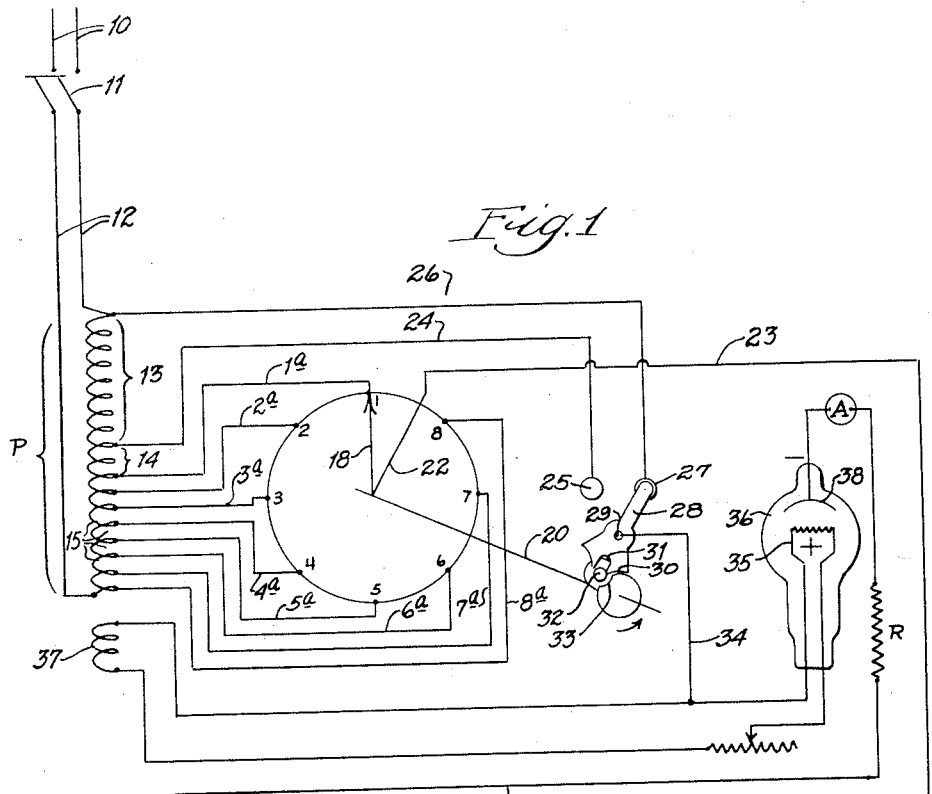
Figure 1 is a wiring diagram of the rectifier including the switch and connections.

The embodiment illustrated comprises a battery charger of the rectifier type which is adapted to be operatively connected to a source of alternating current electricity 10 by means of a switch 11. This connects through leads 12 with the two ends of the primary P of a transformer, which is here shown as an auto-transformer. If desired, however, a transformer using separate primary and secondary may be used. The secondary is divided into a large section 13, a smaller section 14, and a series of still smaller sections 15 which are substantially equal in value. The various leads from the ends of the sections 13, 14 and 15 are connected into the switch, which will now be described, and which forms the subject matter of the present invention.

Figure 2:
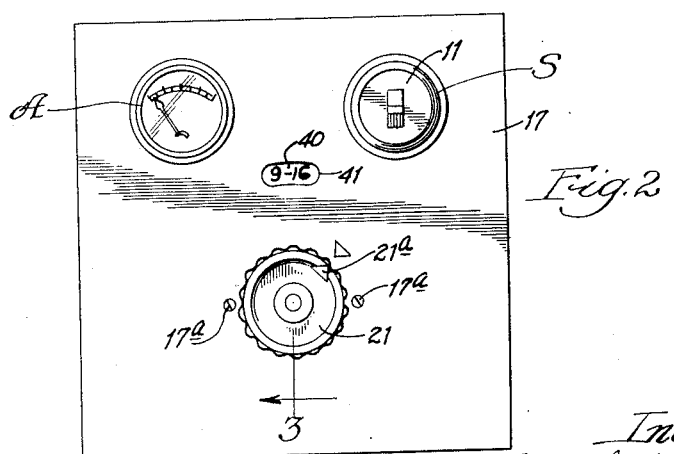
Fig. 2 is a front elevation of the panel of a battery charger.

Referring now to Figs. 3, 4 and 5, the switch comprises an insulating block 16 which is secured to the back of the charger panel 17 by means of screws 17ª (Fig. 2). This block is circular in form, and has molded therein a series of metal contacts which are numbered 1 to 8. Within this ring of metal contacts is located a series of raised portions 16ª separated by depressions 16ᵇ.

A metal brush 18 is mounted upon an insulating block 19, which is carried upon a shaft 20 which is journaled in the center of the circular insulating block 16, and which carries a knob 21 at its outer end, by means of which the metal brush 18 may be turned. This arm has a protuberance, such as a struck-in portion 18ª, which is adapted to overlie the raised portions 16ª and the depressions 16ᵇ of the insulating block 16.

When the shaft 20 is so turned as to bring the protuberance 18ª over one of the depressions 16ᵇ, the brush 18 will spring down so that its outer end is in engagement with one of the electrical contacts 1 to 8. These electrical contacts are connected by means of leads 1ª to 8ª, respectively, with the ends of the sections 15 of the secondary of the transformer. The brush 18 is connected through a central spring 22, which is secured to the periphery of the insulating block 16, and is raised so as to permit the brush 18 to pass thereunder. The spring 22 in turn connects through a lead 23 with one end of the group of batteries B which are to be charged.

A lead 24 connects the junction of the sections 13 and 14 of the secondary of the transformer with a switch contact 25, while a lead 26 connects the opposite end of the section 13 with a switch contact 27. A switch lever 28 is pivotally mounted on a screw 29 and adapted to move back and forth so as to make contact with either of the switch contacts 25 or 27. To do this, the inner end of the switch lever 28 is made into a segment of a Geneva gear having arcuate portions 30, adapted to partially surround the cylindrical portion of the insulating block 19, as shown in Fig. 4, with a slot 31 lying therebetween which is adapted to engage a pin 32 carried by the insulating block 19. This block is cut away at 33 so as to permit the points formed by the lips of the slot 31 to pass as the slot is engaged by the pin 32.

Thus it will be seen that as the knob 21 is turned from one operative position to the next, the protuberance 18ª will ride up over the raised portion 16ᵃ of the insulating block 16, thereby raising the brush 18 out of engagement with the contact and permitting it to again spring down into engagement with the next contact as the protuberance 18ᵃ comes into registration with the next depression 16ᵇ.

It will be observed that the positions of the switch lever 28 are different in Figs. 1 and 4. In Fig. 4, the switch lever 28 is in engagement with the contact 25, whereas in Fig. 1 it is shown in engagement with the contact 27. In Fig. 1, the brush 18 is in engagement with contact 1, whereas in Fig. 4, it is in engagement with contact 8.

With the switch arm 28 in engagement with contact 25, only that portion of the transformer is being utilized as the secondary which lies between the lead 24 and the lead with which the brush 18 is in contact. The voltage which is being supplied to the battery B to be charged depends upon how much of the secondary of the transformer is used. As the operator desires to add voltage, as, for example, when more cells are added to the series of batteries B, to be charged, he does so by cutting in more turns on the secondary, and this is done by advancing the brush 18 step by step over the contacts from 1 to 8. When he reaches the contact 8, the pin 32 engages the slot 31 in the lever arm 28, and as the knob 21, together with the brush 28, continue to move in a counter-clockwise direction, as shown in Fig. 4, the brush 18 is lifted out of engagement with the contact 8, and the pin 32 engaging the slot 31, forces the contact lever 28 from the full to the dotted line position of Fig. 4, thereby shifting this lever arm over into engagement with the contact 27, as shown in Fig. 1.

When this occurs, the section 13 of the transformer is added to the secondary, and this section 13 is substantially equal to all the sections between contacts 1ᵃ and 8ᵃ. Thus it will be seen, that the voltage added to the charge in passing from the position in Fig. 4 in which the brush 18 is in engagement with the contact 8 to the next position in which it is in engagement with contact 1, is substantially equal to that which occurs between any other two adjacent contacts of the block 16.

The switch lever 28 connects through a lead 34 with the filament 35 of a rectifier bulb of the Tungar type 36, which is supplied with an alternating heating current from a secondary 37 of the transformer. The plate or disk 38 of the Tungar bulb is connected through an ammeter A and a reactance R. and lead 39, with one end of the series of batteries B, to be charged.

The switch lever 28 carries a small sheet 40 which is adapted to move behind a window 41 (Fig. 3) in the front panel 17, and this sheet 40 is marked with indicia, such for instance, as "1 to 8" and "9 to 16", as shown in Fig. 2, to indicate in which position the switch lever 28 is located, and thereby indicating whether or not the secondary section 13 of the transformer is in operation or not. In this connection the knob 21 is provided with an idicator 21ᵃ so that the operator, by means of the indicia appearing in the window 41 and the position of the indicator 21ᵃ, will know the approximate position of the controller switches.

It will be understood that while only one slot 31, and only one addition section 13 of the secondary is thus provided for, additional slots 31 may be provided, together with additional sections 13 of the secondary to be thrown in by means of the switch lever 28. In that case, additional indicia would be added to those already on the sheet 40, which will also appear in the window 41. Thus, instead of nearly two revolutions of the shaft 20, three or more revolutions could be employed. It will also be apparent that this same switch may be used for purposes other than inductances, such as capacities, resistances, and so forth. The lever 28 also acts as a stop for the pin 32 when the end of its movement is reached.

While I have shown and described but a few embodiments of my invention, it is to be understood that it is capable of many modifications. Changes, therefore, may be made in the construction and arrangement which do not depart from the spirit and scope of the appended claims.

I claim:

1. In combination, a switch having a plurality of contacts, a rotary brush movable over said contacts, a switch lever movable from one operative position to another by the movement of said brush past a given point in its movement, and a member movable by the switch lever for indicating the position of the switch by rounds of said brush.

2. In combination, a switch having a plurality of contacts, a rotary brush movable over said contacts, a switch lever movable from one operative position to another by the movement of said brush past a given point in its movement, a window, and a member movable by the switch lever and carrying indicia in front of said window for indicating the position of the switch by rounds of said brush.

3. In combination a panel board, a circular switch contact-supporting member mounted on the back of said panel board, a rotary brush mounted on an insulating member for cooperation with said switch contacts and operated from the front of the panel board, a pivoted two-way switch mounted on said circular member adjacent the back of said panel board and a Geneva motion forming an operating connection between said insulating member and said two-way switch.

4. In combination a panel board, a circular switch contact-supporting member mounted on the back of said panel board, a rotary brush mounted on an insulating member for cooperation with said switch contacts and operated from the front of the panel board, a pivoted two-way switch mounted on said circular member adjacent the back of said panel board and a Geneva motion forming an operating connection between said insulating member and said two-way switch, said panel board having a window therein, and indicating means carried by said two-way switch adjacent said window to indicate the position of said switch.

5. In a switch mechanism, in combination, an insulation member having a series of contacts mounted on one side thereof, a rotary brush for cooperation with said contacts, means for supporting and rotating said brush, a pair of contacts mounted on the opposite side of said member, a switch lever pivoted on said member and cooperating with said pair of contacts, a Geneva motion connecting said switch lever and said brush supporting and rotating means.

6. In a switch mechanism, in combination, an insulation member having a series of contacts mounted on one side thereof, a central rotary insulation member having a brush mounted thereon for cooperation with said series of contacts, a pair of contacts and a switch lever mounted on the opposite side of said first insulation member, said lever and said central member having complementary parts forming a Geneva motion for operating said lever upon rotation of said brush.

In testimony whereof, I have hereunto set my hand this 25th day of June, 1930.

BUTLER J. HASKINS.